United States Patent
Kawachi et al.

(10) Patent No.: US 6,777,491 B1
(45) Date of Patent: Aug. 17, 2004

(54) MULTILAYERED ARTICLE, VESSEL AND RESIN COMPOSITION BASED ON POLYETHYLENE

(75) Inventors: Hideshi Kawachi, Ichihara (JP); Hiromi Shigemoto, Ichihara (JP); Yuichiro Terashi, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 332 days.

(21) Appl. No.: 09/637,067

(22) Filed: Aug. 11, 2000

Related U.S. Application Data

(62) Division of application No. 09/064,879, filed on Apr. 23, 1998, now Pat. No. 6,214,426.

(30) Foreign Application Priority Data

Apr. 23, 1997 (JP) ............................................... 9-105816
Apr. 3, 1998 (JP) ............................................. 10-092093

(51) Int. Cl.⁷ .......................... C08L 23/00; C08L 23/06
(52) U.S. Cl. ............................. 525/57; 525/70; 525/78
(58) Field of Search ............................... 525/57, 70, 78

(56) References Cited

U.S. PATENT DOCUMENTS

| | | | |
|---|---|---|---|
| 4,511,610 A | | 4/1985 | Yazaki et al. |
| 4,526,821 A | | 7/1985 | McHenry |
| 4,629,596 A | | 12/1986 | Coffman |
| 4,973,625 A | | 11/1990 | Deyrup |
| 4,983,431 A | | 1/1991 | Gibbons et al. |
| 5,128,410 A | * | 7/1992 | Ilendra et al. |
| 5,453,462 A | | 9/1995 | Watanabe et al. |
| 5,482,770 A | | 1/1996 | Bekele |
| 5,601,891 A | | 2/1997 | Herman et al. |
| 6,214,426 B1 | * | 4/2001 | Kawachi et al. |

FOREIGN PATENT DOCUMENTS

| | | |
|---|---|---|
| EP | 0473176 A3 | 3/1992 |
| EP | 0483696 A2 | 5/1992 |
| JP | 6211748 A | 1/1987 |
| JP | 2261863 A | 10/1990 |
| JP | 5125232 A | 5/1993 |
| WO | WO8803475 A1 | 5/1988 |

* cited by examiner

*Primary Examiner*—Jeffrey Mullis
(74) *Attorney, Agent, or Firm*—Birch, Stewart, Kolasch & Birch LLP

(57) ABSTRACT

A multilayered article and vessel, which are superior in the properties, such as shock resistance, rigidity, an ability to barrier against gasoline and interlayer adhesion, and are permissible of being recycled for reuse, comprising a base layer (A1) comprising a polyetylene resin (a1) having an MFR (ASTM D 1238, 190° C., 2160 g) of 0.001 to 0.5 g/10 min. and a density of 0.945 to 0.980 g/cm³, an adhesive layer (A2) comprising a modified etylene/α-olefin copolymer (a2) which is modified by having grafted thereon an unsaturated carboxylic acid or its derivative and has a density of 0.900 to 0.940 and a barriering layer (B) comprising an ethylene/vinyl alcohol copolymer (b), wherein the Izod impact strength (with notch) (ASTM D 256, −40° C.) for a sheet specimen which is prepared by mechanically crushing the laminate into powder, granulating the resulting powder on a monoaxial extruder to form a resin composition and pressing the granular composition on a press molding machine into a sheet of 3 mm thickness at a temperature of 230° C. under a pressure of 50 kgf/cm² with cooling under the condition defined by ASTM D 1928, is at least 100 J/m.

8 Claims, No Drawings

MULTILAYERED ARTICLE, VESSEL AND RESIN COMPOSITION BASED ON POLYETHYLENE

This application is a divisional of application Ser. No. 09/064,879, filed on Apr. 23, 1998 now U.S. Pat. No. 6,214,426, the entire contents of which are hereby incorporated by reference.

BACKGROUND OF THE INVENTION

1) Field of the Invention

The present invention relates to a multilayered laminate based on polyethylene, vessels made thereof and a resin composition to be used for such laminate as well as a resin composition obtained as a regrind from such laminate or vessel.

2) Related Techniques

A polyolefin, for example, polyethylene, has been used for producing many articles including various vessels due to its superior properties, such as strength, shock resistance, heat resistance etc. For gasoline containers, however, due to an insufficient ability of a polyolefin resin for barriering against gasoline, it has been practised to use polyolefin resin in combination with another resin exhibiting superior ability for barriering against gasoline, such as an ethylene/vinyl alcohol copolymer or a polyamide resin.

Bottles made of a multilayered plastic laminate composed of, for example, a layer of an ethylene/vinyl alcohol copolymer which is superior in the barriering ability against gasoline and a layer of a polyethylene which is superior in the strength and shock resistance, have found their wide uses for, such as smaller containers for agricultural chemicals and larger tanks for gasoline for automobiles. For such a multilayer construction, an adhesive layer is interposed between the polyethylene layer and the ethylene/vinyl alcohol copolymer layer, in order to increase the interlayer adhesion between them.

A multilayer blow molding for producing such a bottle suffers, in general, from occurrence of scraps and flashes amounting to about 30–40 wt.-% of the through-put and, therefore, a reclamation and reuse thereof is unavoidable in the economical point of view. Thus, an additional component layer made of a so-called "regrind" resulting from re-grinding or crushing such scraps and flashes may be employed in particular for the laminate construction. The regrind is made of a ternary mixture of a polyethylene, an ethylene/vinyl alcohol copolymer and an adhesive resin and may cause a deterioration in the appearance and mechanical strengths, such as an impact strength etc., of the resulting product, since the compatibility of a polyethylene with an ethylene/vinyl alcohol copolymer is, in general, poor. For this reason, the regrind-containing layer of prior art is made of a resin composition containing the regrind under dilution by a fresh polyethylene up to such a dilution proportion that would cause no deterioration of the material properties, so that the prior art has only an insufficient contribution to the effective utilization of regrind.

The adhesive layer plays here some role as a "compatibilizer" for improving the compatibility of the polyethylene with the ethylene/vinyl alcohol copolymer, nevertheless, the ability for improving the shock resistance by an adhesive resin of prior art has been insufficient.

Many formulations have been proposed in the past for a regrind comprising a polyolefin and an ethylene/vinyl alcohol copolymer. For example, Japanese Patent Kokais Sho 60-240429 A (corresponding to U.S. Pat. No. 4,629,596), Sho 62-11748 A, Hei 2-261863 A, Hei 3-180341 A and Hei 5-125232 A give various proposals for improving the performances of regrinds comprising a polyolefin and an ethylene/vinyl alcohol copolymer. These prior arts have aimed at an improvement in the stabilization of operation of the process or in the adhesion strength onto the ethylene/vinyl alcohol copolymer, which is different from what is contemplated by the present invention.

Japanese Patent Kokai Sho 57-11052 A discloses a laminate composed of a lamination of (a polyethylene layer)/(a layer of a regrind composed of a polyethylene and an ethylene-vinyl alcohol copolymer)/(a layer of an ethylene-vinyl alcohol copolymer). The compositions of the polyethylene and of the modified polyethylene used in this prior art are not clear by the disclosure of this patent gazette and, in addition, it is intended by this prior art to prevent the interlayer exfoliation and to improve the moldability and the appearance of the molded product. There is in this patent gazette no suggestion as to the resin composition providing for a superior shock resistance such as that according to the present invention. Japanese Patent Kokai Hei 3-72539 A discloses a regrind composition containing a polyethylene and an ethylene/vinyl alcohol copolymer, which discloses, however, only a technique of using a special ethylene/vinyl alcohol copolymer. Japanese Patent Kokai Hei 3-227346 A also discloses a regrind composition containing a polyethylene and an ethylene/vinyl alcohol copolymer, in which, however, only resin compositions having a content of ethylene/vinyl alcohol copolymer of 50% by weight or more are disclosed.

In the past, it has commonly been accepted that the impact strength of a polyethylene resin containing an ethylene/vinyl alcohol copolymer should be decreased by the content of the ethylene/vinyl alcohol copolymer, since this is a foreign matter to polyethylene. However, it was discovered by the inventors from their sound researches for improving the impact strength of such a polyethylene resin of a resin composition containing an ethylene/vinyl alcohol copolymer, that a resin composition based on polyethylene which comprises a high density polyethylene as the main component and which has a specific melt flow rate and a specific density and contains an ethylene/vinyl alcohol copolymer and a modified ethylene/α-olefin copolymer having a specific melt flow rate and a specific density and modified by being grafted thereon with an unsaturated carboxylic acid or its derivative may bring about a resin exhibiting a high impact strength comparable to that of an ethylene homopolymer and, therefore, can be recycled, whereby the present invention has been reached.

SUMMARY OF THE INVENTION

An object of the present invention is to provide a multilayered article based on polyethylene, which is superior in the material properties, such as the shock resistance, rigidity, ability for barriering against gasoline and interlayer adhesion and which, as well as the scraps of which, can be recycled for reuse (in the context of this specification, "scraps" include also flashes).

Another object of the present invention is to provide a vessel based on polyethylene, which is superior in the material properties, such as the shock resistance, rigidity, ability for barriering against gasoline and interlayer adhesion and which, as well as the scraps of which, can be recycled for reuse.

A further object of the present invention is to provide a resin composition based on polyethylene, which is superior in the shock resistance and can be used for a multilayered article as a regrind layer.

Thus, the present invention is directed to a multilayered article, a vessel and a resin composition based on polyethylene as given below:

(1) A multilayered article based on polyethylene comprising
(A1) a base layer comprising a polyetylene resin (a1) having a melt flow rate (MFR) according to ASTM D 1238 (190° C., 2160 g load) in the range from 0.001 to 0.5 g/10 min. and a density in the range from 0.945 to 0.980 g/cm$^3$,
(A2) an adhesive layer comprising a modified etylene/α-olefin copolymer (a2) which is modified by a having grafted thereon an unsaturated carboxylic acid or its derivative and has a density in the range from 0.900 to 0.940 and
(B) a barriering layer comprising an ethylene/vinyl alcohol copolymer (b), wherein the Izod impact strength (with notch) determined according to ASTM D 256 at minus 40° C., for a sheet specimen which is prepared by mechanically crushing the laminate into powder, granulating the resulting powder on a monoaxial extruder to form a resin composition and pressing the granular composition on a press molding machine into a sheet of 3 mm thickness at a temperature of 230° C. under a pressure of 50 kgf/cm$^2$ with cooling under the condition defined by ASTM D 1928, is at least 100 J/m.

(2) A multilayered article as defined in above (1), wherein the flexural elasticity determined by the method defined in ASTM D 790 for a sheet specimen for bending test cut from the sheet as given in above (1) is greater than 3,000 kgf/cm$^2$.

(3) A multilayered article as defined in above (1) or (2), wherein it further comprises
(C) a composition layer comprising a resin composition (c) based on polyethylene, comprising
80–99.5% of an ethylenic polymer (a) and
0.5–20% of the ethylene/vinyl alcohol copolymer (b), based on the weight of the resin composition,
the resin composition having a melt flow rate (MFR) according to ASTM D 1238 (190° C., 2160 g load) in the range from 0.001 to 0.5 g/10 min., a density in the range from 0.940 to 0.970 g/cm$^3$ and an Izod impact strength (with notch), determined according to ASTM D 256 at minus 40° C., of at least 100 J/m.

(4) A multilayered article as defined in above (1) or (2), wherein the resin composition (c) comprises
99.3–50% of a polyethylene resin (a1) having a melt flow rate (MFR) according to ASTM D 1238 (190° C., 2160 g load) in the range from 0.001 to 0.5 g/10 min. and a density in the range from 0.945 to 0.980 g/cm$^3$,
0.2–20% of a modified etylene/α-olefin copolymer (a2) which is modified by having grafted thereon an unsaturated carboxylic acid or its derivative and has a density in the range from 0.900 to 0.940 g/cm$^3$ and
0.5–30% of the ethylene/vinyl alcohol copolymer (b), based on the weight of the composition, and has a melt flow rate (MFR) according to ASTM D 1238 (190° C., 2160 g load) in the range from 0.001 to 0.2 g/10 min., a density in the range from 0.940 to 0.970 g/cm$^3$ and an Izod impact strength (with notch), determined according to ASTM D 256 at minus 40° C., of at least 100 J/m.

(5) A multilayered article as defined in above (3) to (4), wherein the resin composition (c) based on polyethylene is a regrind of the multilayered article and/or scraps thereof.

(6) A multilayered article as defined in either one of above (3) to (5), wherein the composition layer (C) is interposed between the base layer (A1) and the adhesive layer (A2).

(7) A vessel based on polyethylene, which is made of a multilayered article as defined in either one of above (1) to (6).

(8) A resin composition (c) based on polyethylene, comprising
99.3–50% of a polyethylene resin (a1) having a melt flow rate (MFR) according to ASTM D 1238 (190° C., 2160 g load) in the range from 0.001 to 0.5 g/10 min. and a density in the range from 0.945 to 0.980 g/cm$^3$,
0.2–20% of a modified etylene/α-olefin copolymer (a2) which is modified by having grafted thereon an unsaturated carboxylic acid or its derivative and has a density in the range from 0.900 to 0.940 g/cm$^3$ and
0.5–30% of an ethylene/vinyl alcohol copolymer (b), based on the weight of the composition, and having a melt flow rate (MFR) according to ASTM D 1238 (190° C., 2160 g load) in the range from 0.001 to 0.2 g/10 min., a density in the range from 0.940 to 0.970 g/cm$^3$ and an Izod impact strength (with notch), determined according to ASTM D 256 at minus 40° C., of at least 100 J/m.

(9) A resin composition (c) based on polyethylene as defined in above (8), wherein the proportion of the graft-modifying component relative to the entire resin composition (c) is 100–1,500 ppm.

(10) A resin composition (c) based on polyethylene as defined in above (8) or (9), which is a regrind of the multilayered article and/or scraps thereof.

DETAILED DESCRIPTION OF THE INVENTION

The multilayered article according to the present invention comprises basically a base layer (A1) comprising a polyethylene resin (a1), an adhesive layer (A2) comprising a modified ethylene/α-olefin copolymer (a2) and a barriering layer (B) comprising an ethylene/vinyl alcohol copolymer (b). It may further comprises preferably a composition layer (C) comprising a resin composition (c) based on polyethylene may also be preferable, wherein a regrind layer may be used as the composition layer (C).

<The Base Layer (A1)>

As the polyethylene resin (a1) to be used for the base layer (A1) according to the present invention, a high density polyethylene of higher molecular weight, which has a density in the range of 0.945–0.980 g/cm$^3$, preferably 0.945–0.970 g/cm$^3$, especially preferably 0.953–0.960 g/cm$^3$, and a melt flow rate (MFR) determined according to ASTM D 1238 at 190° C. under a load of 2.16 kg in the range of 0.001–0.5 g/10 min., preferably 0.01–0.2 g/10 min., especially preferably 0.02–0.05 g/10 min., may be typified. By using such a polyethylene resin (a1), a resin composition and a multilayered article exhibiting a superior shock resistance, high rigidity and low gasoline-permeability can be obtained.

The polyethylene resin to be used as the component (a1) may either be a homopolymer of ethylene or a random copolymer of ethylene and an α-olefin. In the latter case, the content of the structural unit derived from the α-olefin in the copolymer may amount to 5 mole % or less, preferably 2 mole % or less.

As the α-olefin, there may be exemplified those having 3–10 carbon atoms, such as propylene, 1-butene, 1-hexene, 4-methyl-1-pentene, 1-octene and 1-decene.

For the polyethylene resin (a1) to be used according to the present invention, it is preferable due to the excellency in the moldability and in the impact strength, if the Mw/Mn value determined by gel permeation chromatography is 20 or higher.

Thus, the base layer (A1) according to the present invention comprises the polyethylene resin (a1) as the main component, while it may further comprise additives known in the art, such as an antioxidant (d), a metal compound (e) and others, as described afterwards.

<The Adhesive Layer (A2)>

As the resin for the adhesive layer (A2) and/or as the dispersant for the ethylene/vinyl alcohol copolymer in the resin composition (c), which will be described afterwards, according to the present invention, a specific modified ethylene/α-olefin copolymer (a2) is employed.

The unmodified ethylene/α-olefin copolymer to be used as the starting copolymer of the modified ethylene/α-olefin copolymer (a2) has a density in the range of 0.900–0.940 g/cm$^3$, preferably 0.900–0.935 g/cm$^3$.

According to the present invention, the starting copolymer to be modified is a copolymer of ethylene and another olefin, for example an α-olefin having 3–10 carbon atoms, such as propylene, 1-butene, 1-hexene, 4-methyl-1-pentene, 1-octene or 1 decene.

Concrete examples of the starting ethylene/α-olefin copolymer to be modified include an ethylene/propylene copolymer, an ethylene/1-butene copolymer, an ethylene/1-hexene copolymer, an ethylene/1-octene copolymer and an ethylene/4-methyl-1-pentene copolymer.

Among them, an ethylene/propylene copolymer, an ethylene/1-butene copolymer, an ethylene/1-hexene copolymer and an ethylene/1-octene copolymer are preferred.

The starting ethylene/α-olefin copolymer to be modified according to the present invention may favorably have a content of the structural unit derived from ethylene in the range of 70–99.5 mole %, preferably 80–99 mole %, and a content of the structural unit derived from the α-olefin in the range of 0.5–30 mole %, preferably 1–20 mole %.

For the starting ethylene/α-olefin copolymer, those which exhibit a melt flow rate (MFR) determined according to ASTM D 1238 at 190° C. under a load of 2.16 kg in the range of 0.01–20 g/10 min., preferably 0.05–20 g/10 min, are favorable.

There is no special restriction as to the process for producing the starting ethylene/α-olefin copolymer to be used according to the present invention and it can be produced by a process known per se using a catalyst of transition metal, such as that based on titanium (Ti), chromium (Cr) or zirconium (Zr).

The modified ethylene/α-olefin copolymer (a2) to be used according to the present invention is a graft-modified product of the starting ethylene/α-olefin copolymer mentioned above modified by grafting thereon an unsaturated carboxylic acid or its derivative.

As the unsaturated carboxylic acid or its derivative, there may be exemplified concretely unsaturated carboxylic acids, such as acrylic acid, methacrylic acid, α-ethylacrylic acid, maleic acid, fumaric acid, itaconic acid, citraconic acid, tetrahydrophthalic acid, methyltetrahydrophthalic acid and endo-cis-bicyclo[2.2.1]hept-5-en-2,3-dicarboxylic acid (Nadic acid-trademark), and derivatives of these acids, such as acid halides, amides, imides, acid anhydrides and esters. Among them, unsaturated dicarboxylic acids and their acid anhydrides, in particular, maleic acid, Nadic acid (trademark) and acid anhydrides thereof are preferred.

The graft-modification of the ethylene/α-olefin copolymer can be effected by a method known per se, for example by dissolving the starting ethylene/α-olefin copolymer mentioned above in an organic solvent, adding then to the so-obtained solution an unsaturated carboxylic acid or its derivative together with other additives, such as a radical initiator etc., and causing a grafting reaction at a temperature usually of 60–350° C., preferably 80–190° C., for a duration of 0.5–15 hours, preferably 1–10 hours.

As the organic solvent, any organic solvent capable of dissolving the starting ethylene/α-olefin copolymer can be employed without any special limitation.

For such an organic solvent, there may be exemplified aromatic hydrocarbons, such as benzene, toluene and xylene, and aliphatic hydrocarbons, such as pentane, hexane and heptane.

Alternatively, the graft-modification may also be carried out in such a manner that the ethylene/α-olefin copolymer is reacted with the unsaturated carboxylic acid or its derivative in a solvent-free condition using, for example, an extruder to convert it into the modified ethylene/α-olefin copolymer (a2). For such a reaction, a reaction condition including a reaction temperature usually not lower than the melting point of the starting ethylene/α-olefin copolymer, concretely, a temperature of 100–350° C. and a reaction duration usually of 0.5–10 minutes is employed.

On employing any known graft-modification technique, it is preferable to carry out the grafting raction in the presence of a radical polymerization initiator, in order to achieve an efficient grafting of the unsaturated carboxylic acid or its derivative onto the starting copolymer.

As the radical initiator, there may be exemplified organic peroxides and peresters, such as benzoyl peroxide, dichlorobenzoyl peroxide, dicumyl peroxide, di-tert-butyl peroxide, 2,5-dimethyl-2,5-di-(peroxide benzoate)hexine-3, 1,4-bis(tert-butylperoxyiso-propyl)benzene, lauroyl peroxide, tert-butyl peracetate, 2,5-dimethyl-2,5-di(tert-butylperoxy)hexine-3,2,5-dimethyl -2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds, such as azobisisobutyronitrile and dimethylazoisobutyrate. Among them, dialkyl peroxides, such as dicumyl peroxide, di-tert-butyl peroxide, 2,5-dimethyl-2,5-di(tert-butylperoxy) hexine-3,2,5-dimethyl-2,5 -di(tert-butylperoxy)hexane and 1,4-bis(tert-butylper-oxyisopropyl)benzene are preferred.

Such a radical initiator may be employed in an amount of, usually, 0.001–1 part by weight per 100 parts by weight of the starting ethylene/α-olefin copolymer.

The modified ethylene/α-olefin copolymer (a2) to be used according to the present invention has a density in the range of 0.900–0.940 g/cm$^3$, preferably 0.900–0.935 g/cm$^3$. It is favorable that the grafted amount of the grafting radical derived from the unsaturated carboxylic acid or its derivative (i.e. grafting rate) in the resulting modified ethylene/α-olefin copolymer (a2) may usually be in the range of 0.05–10% by weight, preferably 0.05–5% by weight. By performing the graft-modification until the intrisic viscosity [η] of the resulting modified ethylene/α-olefin copolymer (a2) determined at 135° C. in decalin (decahydronaphthalene) reaches a value in the range of 1.5–4.5 dl/g, preferably 1.6–3 dl/g, the impact strength of the resin product will be increased. By keeping the crystallinity of the modified ethylene/α-olefin copolymer (a2) within the range of 15–70%, preferably 35–70%, a stable adhesion between the layers kept for a long period of time can be attained even if gasoline has penetrated therethrough.

The adhesive layer (A2) may comprise only the modified ethylene/α-olefin copolymer (a2) as mentioned above or a blend of the ethylene/α-olefin copolymer (a2) with another ethylenic polymer and/or with a resin based on an olefinic elastomer. For the said another ethylenic polymer, homopolymers of ethylene and ethylene/α-olefin copolymers produced by any known polymerization process may be exemplified.

In order to attain the objects of the present invention, however, it is preferable that the intrinsic viscosity [η] of the resin of the adhesive layer (A2) composed of the modified ethylene/α-olefin copolymer (a2) and other component(s), determined in decalin (decahydronaphthalene) at 135° C., is in the range from 1.0 to 4.5 dl/g. preferably in the range from 1.2 to 3 dl/g, whereby an improvement in the impact strength can be attained. The density of the resin of the adhesive layer (A2) should favorably be in the range from 0.900 to 0.940 g/cm$^3$. preferably from 0.900 to 0.935 g/cm$^3$, whereby the Impact strength and the drop weight impact strength are increased.

When the total grafting rate of the adhesive layer (A2) is 0.2% by weight or higher, preferably in the range from 0.2 to 2% by weight, an improvement in the impact strength can be attained. If the resin of the adhesive layer (A2) has a total content of insoluble matter insoluble in n-decane (determined by dissolving 8 grams of the resin of adhesive layer completely in 500 ml of n-decane at 140° C. and the solution is cooled to 90° C. to thereby cause the insoluble matter to deposit out, which is filtered at this temperature and weighed) of 2% by weight or less, preferably not higher than 1,8% by weight, improvements in the adhesion strength and in the impact strength of the multilayered article produced from the recycled resin can be attained.

As the olefinic elastomer to be blended in the resin of the adhesive layer (A2), there may be exemplified polyisobutylene, ethylene/propylene rubber, ethylene/1-butene rubber, ethylene/1-octene rubber, butyl rubber, butadiene rubber, styrene/butadiene rubber, ethylene/butadiene rubber and isoprene rubber. There may also be exemplified modified elastomers in which these olefinic elastomers are modified by the above-mentioned unsaturated carboxylic acid or the derivatives thereof. Among them, polyisobutylene, ethylene/propylene rubber, ethylene/1-butene rubber, ethylene/1-octene rubber and the modified products of them are preferred.

Within the range not obstructing the effectiveness of the present invention, other ethylenic polymers and/or olefinic elastomers may be incorporated in an amount usually not higher than 30 parts by weight, preferably not higher than 20 parts by weight, per 100 parts by weight of the modified ethylene/α-olefin copolymer.

The resin of the adhesive layer (A2) may contain known additives, such as the antioxidant (d) and metal compounds (e), which will be described later on, and others.

(The Barriering Layer (B))

The ethylene/vinyl alcohol copolymer (b) (referred to hereinafter sometimes as EVOR) to be used for the barriering layer (B) according to the present invention is a saponification product of a copolymer of ethylene and a vinyl ester, such as vinyl acetate.

The proportion of the structural unit derived from ethylene in the ethylene/vinyl alcohol copolymer (b) may favorably be in the range from 15 to 60 mole %, preferably 25 to 50 mole %, while the proportion of the structural unit derived from the vinyl alcohol comonomer in the copolymer may favorably be in the range from 85 to 40 mole %, preferably from 75 to 50 mole %.

The saponification degree of the ethylene/vinyl alcohol copolymer (b) may favorably be in the range from 80 to 100%, preferably from 90 to 100%.

If the saponification degree is in the above range, the ethylene/vinyl alcohol copolymer (b) is superior in the mechanical properties, in the resistance to oils and in the waterproof property.

When the ethylene content in the ethylene/vinyl alcohol copolymer (b) is in the above range, it has a distinct difference between the moldable temperature range and the decomposition temperature thereof, which render the molding easy, and superior mechanical properties, together with capability of bringing about a multilayered article exhibiting superior barriering property against permeation of gasoline when laminated into the barriering layer (B), as will be described later on. In addition, it permits to produce multilayered articles easily under utilization of regrind thereof, contributing to effective reclamation of resources.

The ethylene/vinyl alcohol copolymer (b) to be used according to the present invention may be modified by, for example, an epoxy compound, isocyanate compound or the like. While the barriering layer (B) comprises the ethylene/vinyl alcohol copolymer (b) as an essential component, it may further comprise, within the range not obstructing the purpose of the present invention, other polymers than the ethylene/vinyl alcohol copolymer (b), such as polyamides (nylons), polyesters, polyolefins, polycarbonates, ionomer resins, polyvinyl acetate, polystyrene, ABS resin, acrylic resins and vinyl chloride resin. It may also contain known additives, such as the antioxidant (d) and metal compound (e), as will be described later on.

<The Composition Layer (C)>

The resin composition (c) based on polyethylene to be used for the composition layer (C) according to the present invention comprises 80–99.5% by weight, preferably 65–99% by weight, especially preferably 90–98% by weight, of the ethylenic polymer (a) and 0.5–20% by weight, preferably 1–15% by weight, especially preferably 2–10% by weight, of the ethylene/vinyl alcohol copolymer, wherein the resin composition (c) may favorably has a melt flow rate (MFR) according to ASTM D 1238 (190° C., 2160 g load) in the range of 0.001–0.5 g/10 min., preferably 0.01–0.2 g/10 min., especially preferably 0.03–0.1 g/10 min., a density in the range of 0.940–0.970 g/cm$^3$, preferably 0.945–0.968 g/cm$^3$, especially preferably 0.952–0.966 g/cm$^3$, and an Izod impact strength (with notch) determined according to ASTM D 256 at minus 40° C. of at least 100 J/m, preferably at least 150 J/m, especially preferably at least 200 J/m.

The ethylenic polymer (a) according to the present invention may also be a blend of the polyethylene resin (a1) with the modified ethylene/α-olefin copolymer (a2). In this case, the mixing proportion of the polyethylene resin (a1), the modified ethylene/α-olefin copolymer (a2) and the ethylene/vinyl alcohol copolymer (b) may favorably be in the range of 99.3–50% by weight, preferably 99–65% by weight, especially preferably 95–70% by weight, for the polyethylene resin (a1), 0.2–20% by weight, preferably 0.5–15% by weight, especially preferably 1–10% by weight, for the modified ethylene/α-olefin copolymer (a2) and 0.5–30% by weight, preferably 1–25% by weight, especially preferably 2–20% by weight, for the ethylene/vinyl alcohol copolymer (b).

Within the proportion of the polyethylene resin (a1) of the resin composition (c) in the above range, the resin (a1) constitutes the matrix and a strength against shock can be attained. When the proportion of the modified ethylene/α-olefin copolymer (a2) is in the above range, the dispersion of the ethylene/vinyl alcohol copolymer (b) in the polyethylene rsin (a1) is better, whereby the impact strength, rigidity and the barrierability against permeation of gasoline of the resin composition (c) based on polyethylene are held high. When the proportion of the ethylene/vinyl alcohol copolymer (b) is in the above range, there is no fear of lowering the impact strength of the resin composition (c) based on polyethylene.

According to the present invention, it is preferable to choose the mixing ratio of the modified ethylene/α-olefin copolymer (a2) to the ethylene/vinyl alcohol copolymer (b) within the range from 1/9 to 9/1, within which the composition may have a better balance between the impact strength, the rigidity and the gasoline-imperviousness.

The polyethylene-based resin composition (c) according to the present invention should favorably have a melt flow rate (MFR) according to ASTM D 1238 (190° C., 2160 g load) in the range of 0.001–5 g/10 min., preferably 0.02–0.5 g/10 min., especially preferably 0.03–0.1 g/10 min., and a density in the range of 0.940–0.970 g/cm$^3$, preferably 0.945–0.968 g/cm$^2$, especially preferably 0.952–0.966 g/cm$^3$.

The characteristic feature of the polyethylene-based resin composition (c) according to the present invention resides in that the impact strength thereof determined at minus 40° C. is quite high, as being at least 100 J/m. Such a value is even high as compared with that of pure polyethylene and amounts to more than one third of that of a pure polyethylene having the same MFR. This is higher enough, since the impact strength of a known resin composition similar to that of the present invention was 1/10 or less of the pure polyethylene.

The composition layer (C) comprises as the main component the polyethylene-based resin composition (c) comprising the ethylenic copolymer (a) and the ethylene/vinyl alcohol copolymer (b), wherein it may further comprise, if necessary, other additives known to those skilled in the art, such as the antioxidant (d) and the metal compounds (e), as will be described later on. The resin composition (c) may be prepared by blending each of freshly produced component resins or by using a regrind containing such component resins. When a regrind is employed, each of the component resins (a1, a2 and b) may be a regrind thereof or a part of such component resins may be a frech product.

The regrind is a product obtained by crushing scraps and flashes which occur upon the production of the multilayered articles using the base layer (A1), the adhesive layer (A2) and the barriering layer (B) and which have got a thermal hysteresis.

When the average particle size of the ethylene/vinyl alcohol copolymer (b) in the regrind is in the range of 0.1–10 μm, preferably 0.1–5 μm, especially preferably 0.1–3 μm, and the content of the ethylene/vinyl alcohol copolymer (b) in the regrind is in the range of 0.5–10% by weight, preferably 2–8% by weight, the composition layer (C) produced therefrom will exhibit high impact strength.

<Antioxidant (d)>

For the antioxidant (d) which may favorably be incorporated in the base layer (A1), in the adhesive layer (A2), in the barriering layer (B) and in the composition layer (C), those which are usually employed in polyalefin, such as phenolic, phosphorus-containing and sulfur-containing ones, may be used either solely or in combination, wherein a combination of a phenolic antioxidant with a phosphorus-containing antioxidant is used preferably.

As the phenolic antioxidant, there may be exemplified 2,6-di-tert-butyl-p-cresol (BHT), o-tert-butyl-p-cresol (BHA), tetrakis [methylene-3-(3,5-di-tert-butyl-4-hydroxyphenyl)propionato]methane [IRGANOX 1010 (trademark)], 1,1-bis(4-oxyphenyl)cyclohexane, 1,3,5-trimethyl-2,4,6-tris(3,5-di-tert-butyl-4-hydraxybenzene), 2,6-bis (2'-hydroxy-3'-tert-butyl-5'-methylbenzyl)-4-methylphenol, 2,2-thiobis(4-methyl-6-tert-butylphenol), p-hydroxy-diphenylamine and cumaron derivatives, such as tocopherol and the like.

As the phosphorus-containing antioxidant, there may be exemplified tris(2,4-di-tert-butylphenyl)-phosphite [IRGAPHOS 168 (trademark)], bis(2,6-di-tert-butyl-4-methylphenyl)pentaerythritol-di-phosphite [Mark PEP-36 (trademark)], tetrakis(2,4-ditert-butylphenyl)-4,4'-biphenylenediphosphite (P-EPQ) and so on.

As the sulfur-containing antioxidant, there may be exemplified dilauryl thiodipropionate (DLTP), distearyl thiodipropionate (DSTP) and so on.

The amount of the antioxidant (d) to be added may favorably be in the range of 0.01–0.5 part by weight, preferably 0.01–0.3 part by weight, per 100 parts by weight of the total sum of the (a1), (a2), (b) and (c). In the case of simultaneous use of two or more antioxidants (d), they are used so that the total sum of them will reach an amount within the above defined range. According to the present invention, it is preferable to use a phenolic antioxidant in combination with a phosphorus-containing antioxidant, wherein the weight ratio of the phenolic antioxidant to the phosphorus-containing antioxidant will be in the range from 5:1 to 1:5.

(The Metal Compound (e))

As the metal for the metal compound (e) to be added preferably to the resin of the base layer (A1), the adhesive layer (A2), the barriering layer (B) or the composition layer (C), there may be exemplified metals of the 1, 2, 3, 4, 5, 12, 13 and 14 Group of the Periodic Table of long form with 18 groups according to the 1989 revised edition of Nomenclature of Inorganic Compound by IUPAC and, concretely, sodium, potassium, magnesium, calcium, strontium, barium, zinc, cadmium, aluminum, silicium, tin, lead and titnium may favorably be employed.

As the metal compounds (e) used favorably, there may be exemplified metal oxides, such as magnesium oxide, calcium oxide, aluminum oxide, silicium dioxide and titanium dioxide; metal hydroxides, such as magnesium hydroxide, calcium hydroxide, aluminum hydroxide and orthotitanlc acid; metal carbonats, such as potassium carbonate, sodium hydrogencarbonate, sodium carbonate, magnesium carbonate and calcium carbonate; metal sulfates, such as magnesium sulfate, calcium sulfate, barium sulfate and aluminum sulfate; and metal silicates, such as sodium metasilicate, anhydrous sodium silicate, lithium metasilicate, anhydrous lithium silicate, potassium metasilicate, anhydrous potassium silicate, magnesium silicate, magnesium metasilicate, calcium silicate and aluminosilicates. They may be either of natural or synthetic origin. Mixtures of two or more of them may also be employed. Examples of the natural compounds include talc, bentonite and hydrotalcite.

As the metal salts of higher fatty acids, there may be enumerated, for example, metal salts of carboxylic acids having 7–23 carbon atoms, especially 11–21 carbon atoms. Thus, salts of sodium, magnesium, calcium and zinc of straight chain aliphatic carboxylic acids, such as lauric acid, palmitic acid, stearic acid and behenic acid, may favorably be employed.

For these metal compounds (e), wherein they are present as solids, the finer their particle size, the more will be preferable. It is enough, however, that the average particle size thereof is not higher than 150 μm, especially not higher than 40 μm. The shape of these compounds may be flat, lumpy, needle-like and in any other form, wherein a curved form of some round configuration, especially spherical form may be preferred.

The amount of the metal compound to be added to the resin of (a1), (a2), (b) or (c) may preferably be in the range of 0.01–0.4 parts by weight per 100 parts by weight of the resin. In the case of using two or more metal compounds (e) in combination, they are added to the resin so that their total amount will be in the above range.

<The Multilayered Article>

The multilayered article according to the present invention has a basic lamination structure in which the base layer (A1), the adhesive layer (A2) and the barriering layer (B) are laminated. In general, however, the composition layer (C) is additionally incorporated therein. For the resin composition for the layer (C), a regrind resin may perferably be employed, while freshly formulated resin composition may, of course, be used therefor. A blend of such a regrind and the fresh resin composition may, if possible, also be employed.

As a preferred mode of the multilayered article according to the present invention, one in which the composition layer (C) is interposed between the base layer (A1) and the barriering layer (B) may be exemplified. An alternative preferred mode of the multilayered article according to the present invention has a lamination structure in which the composition layer (C) is interposed between the base layer (A1) and the adhesive layer (A2).

Examples of the lamination structure of the multilayered article according to the present invention include the following laminations:

A1/A2/B
A1/C/A2/B
A1/C/A2/B/A2
A1/A2/B/C
A1/C/A2/B/C/A1
A1/A2/B/A2/C
A1/C/A2/B/A2/A1
A1/C/A2/B/A2/C
A1/C/A2/B/A2/C/A1

Among them, a multilayered article having a laminatioon structure, in which the composition layer (C) is found on either one side or on both sides of the barriering layer (B) and, in addition, in between the base layer (A1) and the adhesive layer (A2), is preferred.

While the proportion of the layer thickness for each layer relative to the total thickness of the entire multilaminated article may not specifically be limited, it may preferably be in the range of 30–95% for the base layer (A1) as an outermost layer, 1–20% for the adhesive layer (A2), 1–25% for the barriering layer (B) and 20–60% for the composition layer (C), in view of the balance between the impact strength, rigidity and the gasoline-imperviousness. Here, it is preferable to choose a thickness proportion so that the regrind of the resulting multilayered article will have the resin composition of the composition layer (C).

In the multilayered article, the adhesive layer (A2) comprising the modified ethylene/α-olefin copolymer (a2) functions as an adhesive for binding the base layer (A1) or the composition layer (C) with the barriering layer (B). The adhesion of the layer (A1) onto the layer (C) or onto the layer (A2) is better and the lamination can be effected by means of, for example, the technique of direct co-extrusion.

In using a regrind for the composition layer (C) in an ordinanry commercial production, it is preferable to add thereto an antioxidant (d), since a regrind should have been subjected to repeated thermal hysteresis and, therefore, the rigand layer would tend to suffer from an oxidative deterioration. The addition of the antioxidant (d) may be effected either to the resin of the layer (C) directly or to the resin of the layer (A1), (A2) or (C). In an ordinary production work, it is added to the resin of the layer (A1) and/or the layer (A2) and/or the layer (C).

The ethylene/vinyl alcohol copolymer (b) is, in general, more subject to thermal degradation as compared with a polyethylene or a modified polyethylene resin composition and is apt to cause a phenomenon of yellowing or gellation. When a regrind is used therefor, occurrence of gellation of the ethylene/vinyl alcohol copolymer (b) may be promoted by a possible formation of hydrochloric acid caused by the residual catalyst present in the polyethylene of the outer layer. Therefore, it is preferable to incorporate the metal compound (e) as a hydrochloric acid absorber in the adhesive layer (A2) adjoining the barriering layer (B). The metal compound (e) may be added to the resin in of the layer (A1) and/or (A2), wherein addition thereof to the resin of the layer (A2) is more effective.

The multilayered article according to the present invention should be characterized by that the Izod impact strength (with notch) determined according to ASTM D 256 at minus 40° C., for a sheet specimen which is prepared by mechanically crushing the multilayered article and sieved through a screen of a mesh inside span of 7 mm into a regrind, granulating the resulting regrind on a monoaxial extruder to form a granular resin composition and pressing this granular composition on a press molding machine into a sheet of a thickness of 3 mm at a temperature of 230° C. under a pressure of 50 kgf/cm$^2$ with a mild cooling under the condition defined by ASTM D 1928, is at least 50 J/m, preferably at least 100 J/m. This Izod impact strength value for the sheet specimen made from the crushed regrind of the multilayered article is quite superior than that of conventional multilayered articles of known resin compositions based on a polyolefin and etylene/vinyl alcohol copolymer. This Izod impact strength indicates a parameter for the impact strength of a reclaimed multilayered article made by using, as the composition layer (C), a regrind of the original multilayered article used to determine the above-mentioned Izod impact strength.

The multilayered article according to the present invention may be a sheet, film, vessel or anything else, produced by, for example, extrusion lamination, casting, blow molding and so on.

<The Vessel>

The vessel according to the present invention is obtained by forming the multilayered article as described above into a vessel. The vessel may be in any voluntary shape, such as a tank, bottle, cup, tray and so on. The outermost layer of the vessel may be constituted preferably of the base layer (A1) or of the composition layer (C), whereby a high impact strength of the vessel can be obtained. By the presence of the barriering layer (B), an imperviousness against, for example, gasoline and organic solvents, can be realized.

The vessel can be produced by, for example, a blow molding, compression pneumatic molding, vacuum molding and injection molding, wherein blow molding is adapted to produce larger vessels, such as tanks and large bottles.

The vessel according to the present invention exhibits a pronounced rigidity and is superior in the ability for barriering against gasoline and very excellent in the resistance to shock, especially at low temperatures, so that it is highly suitable as a larger vessel, such as the gasoline tank for automobile. When it is used as a gasoline tank, no deterioration in the regrind layer nor interlayer separation by the gasoline filled therein will occur in the course of long term operation, since it is superior in the interlayer adhesion.

As detailed above, the multilayered article according to the present invention is superior in the characteristic properties of shock resistance, rigidity, gasoline-barriering ability and interlayer adhesion, since it comprises, under lamination, the base layer comprising a specific polyethylene resin, the adhesive layer comprising a specific modified ethylene/α-olefin copolymer and the barriering layer comprising a spesific ethylene/vinyl alcohol copolymer, wherein the scraps thereof can be recycled for reuse.

By laminating additionally a layer comprising a resin composition based on polyetylene containing the polyethylene resin, the modified ethylene/α-olefin copolymer and the ethylene/vinyl alcohol copolymer, a multilayered article exhibiting a high impact strength can be obtained and recycling of the multilayered article and the scraps therefrom becomes permissible.

The vessel based on polyethylene according to the present invention is superior in the characteristic properties, such as resistance to shock, rigidity, gasoline-barriering ability and interlayer adhesion, which, as well as the scraps of which, can be recycled, since it is made of the above-mentioned multilayered article.

The resin composition based on polyethylene according to the present invention is superior in the shock resistance and can be processed into vessels based on polyethylene, of which regrind can be reused for producing a multilayered article as a regrind layer, since the composition is composed of the above-mentioned component resins.

THE BEST MODE FOR EMBODYING THE INVENTION

Below, the present invention will be described more concretely by way of Examples, which, however, should not be regarded as restricting the scope of the present invention.

EXAMPLE 1

(Modification of Ethylene/α-olefin Copolymer)

100 parts by weight of an ethylene/1-butene copolymer (PE-1) having a density of 0.921 g/cm$^3$, an MFR according to ASTM D 1238 (190° C., 2160 g) of 2.0 g/10 min. and a 1-butene content of 4 mole % are mixed with 0.8 part by weight of maleic anhydride and 0.07 part by weight of a peroxide [PERHEXIN 25B (trademark) of Nippon Oil & Fats Co.] and the resulting mixture was subjected to a melt-grafting on a monoaxial extruder settled at 230° C. to obtain a modified ethylene/1-butene copolymer (MAH-PE-1). Analyzing the modified ethylene/1-butene copolymer for its grafted amount by an IR analysis, the amount of maleic anhydride grafted thereon was found to be 0.80% by weight. The intrinsic viscosity [η] determined in decalin at 135° C. was found to be 1.86 dl/g. The results are summarized in Table 1.

<Production of Modified Ethylene/α-olefin Copolymer (a2)>

50 parts by weight of the above modified ethylene/1-butene copolymer (MAH-PE-1), 50 parts by weight of an ethylene/1-butene copolymer having a density of 0.92 g/cm$^3$, an MFR according to ASTM D 1238 (190° C., 2160 g) of 2.0 g/10 min. and a 1-butene content of 4 mole %, 0.1 part by weight of a phenolic antioxidant IRGANOX 1010 (trademark, a product of Ciba-Geigy), 0.1 part by weight of a phosphorus-containing antioxidant IRGAPHOS 168 (trademark, a product of Ciba-Geigy) and 0.1 part by weight of synthetic hydrotalcite (with an average particle size of 1 μm) were homogenized on a Henschel mixer and the resulting mixture was melt-mixed on a monoaxial extruder settled at 230° C. to obtain a modified ethylene/1-butene copolymer composition (AD-1) to be used for the adhesive layer (A2). This AD-1 had an MFR of 0.7 g/10 min., a density of 0.921 g/cm$^3$ and a grafted amount of maleic anhydride of 0.43% by weight. The results are summarized in Table 2.

(Production of Multilayered Article)

Using a four-resin-six-layer blow molding machine having an extrusion die designed so as to laminate molten resins in 6 layers within the die, a bottle made of five-layered laminate and having a height of 150 mm and an internal volume of 500 ml was molded at a molding temperature of 230° C. in such a manner, that the laminate was composed of, from the outermost layer in. order, a base layer (A1) made of a high density polyethylene (HDPE) [HIZEX 8200 B (trademark) of Mitsui Chemicals, Inc., density=0.956 g/cm$^3$, MFR (ASTM D 1238, 190° C., 2160 g)=0.03 g/10 min.], an adhesive layer (A2) made of a modified ethylene/α-olefin copolymer (AD-1), a barriering layer (B) made of an ethylene/vinyl alcohol copolymer (EVOH) [EVAL EP-F 101A (trademark) of Kuraray Co., MFR (ASTM D 1238, 190° C., 2160 g)=1.3 g/10 min, density=1.19 g/cm$^3$, ethylene content=32 mole %, saponification degree=100%], an adhesive layer (A2) made of a modified ethylene/α-olefin copolymer (AD-1) and a base layer (A1) made of a high density polyethylene (HDPE) [HIZEX 8200 B (trademark) of Mitsui Chemicals, Inc., density=0.956 g/cm$^3$, MFR (ASTM D 1238, 190° C., 2160 g)=0.03 g/10 min.], wherein the layer tickness ratio (converted into weight ratio) was settled to be:

(A1)/(A2)/(B)/(A2)/(A1)=45/2/5/2/46(%)

(Production of the Resin Composition (c) Based on Polyethylene)

The bottle obtained as above was crushed using a crusher and the crushed mass was melt-kneaded and extruded by a monoaxial full-flight screw extruder of a compression rate of 4.0 to obtain a pelletized resin composition (c) based on polyethylene, which is referred to as C-1.

(Performance Assessment of the Resin Composition (c) Based on Polyethylene)

The pellets C-1 obtained as above were melt-pressed on a heat-melting press molding machine in a heated molding flask at a temperature of 230° C., followed by cooling under the condition defined by ASTM D 1928 to solidify the pressed product into a sheet of a thickness of 3 mm. For a dumbbell test specimen punched out from the resulting 3 mm thick sheet, an Izod impact test (according to ASTM D 256 with notch) was carried out at an ambient temperature of minus 40° C. Results are given in Table 3.

<Production of Multilayered Article and Performance Assessment>

Using a four-resin-six-layer blow molding machine having an extrusion die designed so as to laminate molten resins in 6 layers within the die, a bottle made of six-layered laminate and having a height of 150 mm and an internal volume of 500 ml was molded at a molding temperature of 230° C. in such a manner, that the laminate was composed of, from the outermost layer in order, a base layer (A1) made of a high density polyethylene (HDPE) [HIZEX 8200 B: (trademark) of Mitsui Chemicals, Inc., density=0.956g/cm$^3$, MFR (ASTM D 1238, 190° C., 2160 g)=0.03 g/10 min.], a composition layer (C) made of the above C-1, an adhesive layer (A2) made of a modified ethylene/α-olefin copolymer (AD-1), a barriering layer (B) made of an ethylene/vinyl alcohol copolymer (EVOH) [EVAL EP-F101A (trademark) of Kuraray Co., MFR (ASTM D 1238, 190° C., 2160 g)=1.3 g/10 min, density=1.19 g/cm³, ethylene content=32 mole %, saponification degree=100%], an adhesive layer (A2) made of a modified ethylene/α-olefin copolymer (AD-1) and a base layer (A1) made of a high density polyethylene (HDPE) [HIZEX 8200 B (trademark) of Mitsui Chemicals, Inc., density=0.956 g/cm³, MFR (ASTM D 1238, 190° C., 2160 g)=0.03 g/10 min.], wherein the layer tickness ratio (converted into weight ratio) was settled to be:

(A1)/(C)/(A2)/(B)/(A2)/(A1)=13/40/2/3/2/40(%)

<Evaluation of Interlayer Adhesion Strength of the Multi-layered Article>

A test specimen with a width of 15 mm was cut from the side wall of the bottle obtained as above and was tested for the interlayer adhesion strength between the layer (A2) and the layer (B), i.e. adhesion onto EVOH, by a T-peeling method at a peeling velocity of 50 mm/min. The results are given in Table 5.

<Production of a Recycled Product and its Performance Assessment>

The bottle obtained as above was crushed using a crusher and the crushed mass was melt-kneaded and extruded at 220° C. by a monoaxial full-flight screw extruder of a compression ratio of 4.0 to obtain a pelletized product of recycled resin composition (c) based on polyethylene (C-1). The resulting pellets C-1 were melt-pressed on a heat-melting press molding machine in a heated molding flask at a temperature of 230° C., followed by cooling under the condition defined in ASTM to solidify the pressed product into a sheet of a thickness of 3 mm. For a dumbbell test specimen punched out from the resulting 3 mm thick sheet, an Izod impact test (according to ASTM D 256 with notch) was carried out at an ambient temperature of minus 40° C. Results are given in Table 5.

EXAMPLE 2

The procedures of Example 1 were followed with the exception that the composition of the modified ethylene/α-olefin copolymer (a2) was changed as shown in Table 2. The results are given in Tables 3 and 5.

EXAMPLES 3–5

The ethylene/α-olefin copolymers given in Table 1 were subjected to modofication by maleic anhydride in the same manner as in Example 1. Here, however, some alterations in the modification rate were allowed in some cases. By blending the resulting modified product with an ethhylene/α-olefin copolymer in a mixing proportion as given in Table 2 in the same manner as in Example 1, a modified ethylene/α-olefin copolymer (a2) was synthesized.

Using the modofied ethylene/α-olefin obtained as above, a multilayered article was produced as in Example 1, whereupon the resulting article was crushed and melt-kneaded on a monoaxial extruder into a resin compsition (c) based on polyethylene. The results are given in Table 3.

Using the so-obtained resin composition based on polyethylene, a multilayered article was produced, for which the adhesion strength onto EVOH and the Izod impact strength of the recycled product were tested. The results are given in Table 5.

Comparative Examples 1–3

Modification of the ethylene/α-olefin copolymers given in Table 1 by maleic anhydride was carried out in the same manner as in Example 1, wherein, however, some altrations in the modification rate were allowed in some cases. By blending the resulting modified product with an ethhylene/α-olefin copolymer in a mixing proportion as given in Table 2 in the same manner as in Example 1, a modified ethylene/α-olefin copolymer (a2) was synthesized.

Using the modofied ethylene/α-olefin obtained as above, a multilayered article was produced as in Example 1, whereupon the resulting article was crushed and melt-kneaded on a monoaxial extruder into a resin compsition (c) based on polyethylene. The results are given in Table 4.

Using the so-obtained resin composition based on polyethylene, a multilayered article was produced, for which the adhesion strength onto EVOH and the Izod impact strength of the recycled product were tested. The results are given in Table 6.

EXAMPLE 6

Using the modified ethylene/α-olefin copolymer (a2) (AD-1) synthsized in Example 1, a bottle made of multi-layered laminate having the laminate construction givn in Table 3 was produced as in Example 1. This bottle was crushed and melt-kneaded on a monoaxial extruder as in Example 1 to obtain a resin composition (c) based on polyethylene. The results are given in Table 4.

TABLE 1

Modification of Ethylene/α-olefin Copolymer

| | | Material Properties of the Copolymer | | | | | |
|---|---|---|---|---|---|---|---|
| | | Before Modification | | | | After Modification | |
| Copolymer | Resin | MFR g/10 min. | Density g/cm³ | Comonomer | Content mole % | Wt.-% grafted Maleic anhyd. | Intr. Viscos. [η] dl/g |
| MAH-PE-1 | PE-1 | 2.0 | 0.921 | 1-butene | 4 | 0.80 | 1.86 |
| MAH-PE-2 | PE-2 | 1.0 | 0.922 | 1-butene | 4 | 0.87 | 2.11 |
| MAH-PE-3 | PE-3 | 1.0 | 0.935 | 1-butene | 2 | 0.25 | 1.74 |
| MAH-PE-4 | PE-4 | 3.5 | 0.922 | 1-butene | 4 | 0.32 | 1.65 |
| MAH-PE-5 | PE-5 | 15 | 0.965 | none | 0 | 0.88 | 1.24 |
| MAH-PE-6 | PE-6 | 12 | 0.925 | 1-butene | 4 | 0.80 | 1.29 |

TABLE 2

Modified Ethylene/α-olefin Copolymer (a2)

| | Mixing Proportion | | Material Property after Compounding | | |
|---|---|---|---|---|---|
| | Modified Copolymer (wt.-%) | Starting Copolymer (wt.-%) | MFR g/10 min. | Density g/cm³ | Modificat. Rate (wt. %) |
| AD-1 | MAH-PE-1 (50) | PE-1 (50) | 0.7 | 0.921 | 0.43 |
| AD-2 | MAH-PE-1 (40) | PE-1 (60) | 0.9 | 0.921 | 0.33 |
| AD-3 | MAH-PE-2 (40) | PE-1 (60) | 0.9 | 0.921 | 0.35 |
| AD-4 | MAH-PE-3 (100) | — | 0.25 | 0.934 | 0.32 |
| AD-5 | MAH-PE-4 (100) | — | 0.32 | 0.922 | 0.32 |
| AD-6 | MAH-PE-1 (20) | PE-1 (80) | 1.2 | 0.921 | 0.17 |
| AD-7 | MAH-PE-5 (40) | PE-1 (60) | 2.3 | 0.923 | 0.35 |
| AD-8 | MAH-PE-6 (40) | PE-1 (60) | 2.5 | 0.922 | 0.32 |

TABLE 3

Material Properties of Resin Composition (c) based on Polyethylene

| Layer Composition | | Lamination Construction | | | | |
|---|---|---|---|---|---|---|
| Layer | Wt. % | Example 1 | Example 2 | Example 3 | Example 4 | Example 5 |
| A1 | 45 | HDPE-1 | HDPE-1 | HDPE-1 | HDPE-1 | HDPE-1 |
| A2 | 2 | AD-1 | AD-2 | AD-3 | AD-4 | AD-5 |
| B | 6 | EP-F 101A | EP-F 101A | EP-F 101A | EP-F 101A | EP-F 101A |
| A2 | 2 | AD-1 | AD-2 | AD-3 | AD-4 | AD-5 |
| A1 | 46 | HDPE-1 | HDPE-1 | HDPE-1 | HDPE-1 | HDPE-1 |
| Material Property | | | | | | |
| Izod impact strength (−40° C.: J/m) | | 390 | 410 | 430 | 380 | 360 |
| Modification rate (ppm) | | 170 | 130 | 140 | 120 | 130 |
| Identification | | C1 | C2 | C3 | C4 | C5 |

TABLE 4

Material Properties of Resin Composition (c) based on Polyethylene

| Layer Composition | | Lamination Construction | | | Layer Composition | | |
|---|---|---|---|---|---|---|---|
| | | Compar. | Compar. | Compar. | | | |
| Layer | Wt. % | Example 1 | Example 2 | Example 3 | Layer | Wt. % | Example 6 |
| A1 | 45 | HDPE-1 | HDPE-1 | HDPE-1 | A1 | 41 | HDPE-1 |
| A2 | 2 | AD-6 | AD-7 | AD-8 | A2 | 4 | AD-1 |
| B | 5 | EP-F 101A | EP-F 101A | EP-F 101A | B | 10 | EP-F 101A |
| A2 | 2 | AD-6 | AD-7 | AD-8 | A2 | 4 | AD-1 |
| A1 | 46 | HDPE-1 | HDPE-1 | HDPE-1 | A1 | 41 | HDPE-1 |
| Material Property | | | | | | | |
| Izod impact strength (−40° C.: J/m) | | 60 | 70 | 60 | | | 390 |
| Modification rate (ppm) | | 70 | 140 | 130 | | | 340 |
| Identification | | C6 | C7 | C8 | | | C9 |

TABLE 5

Material Properties of Multilayered Article and Recycled Product

| Layer Composition | | Lamination Construction | | | | |
|---|---|---|---|---|---|---|
| Layer | Wt. % | Example 1 | Example 2 | Example 3 | Example 4 | Example 5 |
| A1 | 13 | HDPE-1 | HDPE-1 | HDPE-1 | HDPE-1 | HDPE-1 |
| C | 40 | C1 | C2 | C3 | C4 | C5 |
| A2 | 2 | AD-1 | AD-2 | AD-3 | AD-4 | AD-5 |

TABLE 5-continued

Material Properties of Multilayered Article and Recycled Product

| Layer Composition | | Lamination Construction | | | | |
|---|---|---|---|---|---|---|
| Layer | Wt. % | Example 1 | Example 2 | Example 3 | Example 4 | Example 5 |
| B | 3 | EP-F 101A | EP-F 101A | EP-F 101A | EP-F 101A | EP-F 101A |
| A2 | 2 | AD-1 | AD-2 | AD-3 | AD-4 | AD-5 |
| A1 | 40 | HDPE-1 | HDPE-1 | HDPE-1 | HDPE-1 | HDPE-1 |
| Material Property | | | | | | |
| Adhesion Strength (kgf/15 mm) | | 12 | 12 | 10 | 11 | 12 |
| Izod impact strength (−40° C.: J/m) of Recycled Product | | 410 | 380 | 420 | 380 | 360 |

TABLE 6

Material Properties of Multilayered Article and Recycled Product

| Layer Composition | | Lamination Construction | | |
|---|---|---|---|---|
| | | Compar. | Compar. | Compar. |
| Layer | Wt. % | Example 1 | Example 2 | Example 3 |
| A1 | 13 | HDPE-1 | HDPE-1 | HDPE-1 |
| C | 40 | C6 | C7 | C8 |
| A2 | 2 | AD-6 | AD-7 | AD-8 |
| B | 3 | EP-F 101A | EP-F 101A | EP-F 101A |
| A2 | 2 | AD-6 | AD-7 | AD-8 |
| A1 | 40 | HDPE-1 | HDPE-1 | HDPE-1 |
| Material Property | | | | |
| Adhesion Strength (kgf/15 mm) | | 11 | 9 | 9 |
| Izod impact strength (−40° C.: J/m) of Recycled Product | | 70 | 60 | 80 |

What is claimed is:

1. A resin composition (c) which is based on polyethylene, comprising
    99.3%—higher than 50% of a polyethylene resin (a1) having a melt flow rate (MFR) according to ASTM D 1238 (190° C., 2160 g load) in the range from 0.001 to 0.5 g/10 min. and a density in the range from 0.945 to 0.980 g/cm$^3$, 0.2–20% of a modified ethylene/α-olefin copolymer (a2) which is modified by having grafted thereon an unsaturated dicarboxylic acid or its anhydride and has a density in the range from 0.900 to 0.940 g/cm$^3$ and
    0.5–30% of an ethylene/vinyl alcohol copolymer (b), based on the weight of the composition,
and having a melt flow rate (MFR) according to ASTM D 1238 (190° C., 2160 g load) in the range from 0.001 to 0.2 g/10 min., a density in the range from 0.940 to 0.970 g/cm$^3$ and an Izod impact strength (with notch), determined according to ASTM D 256 at minus 40° C., of at least 100 J/m.

2. The resin composition (c) based on polyethylene as claimed in claim 1, wherein the proportion of the graft-modifying component relative to the entire resin composition (c) is 100–1,500 ppm.

3. The resin composition based on polyethylene as claimed in claim 1, which is obtained by crushing a multi-layered article and/or is a regrind of scraps of a multilayered article.

4. The resin composition based on polyethylene as claimed in claim 1, wherein the amount of unsaturated dicarboxylic acid or its anhydride grafted on the copolymer (a2) is in the range from 0.05 to 5% by weight.

5. A resin composition (c) which is based on polyethylene, comprising
    99–65% of a polyethylene resin (a1) having a melt flow rate (MFR) according to ASTM D 1238 (190° C., 2160 g load) in the range from 0.001 to 0.5 g/10 min. and a density in the range from 0.945 to 0.980 g/cm$^3$,
    0.5–15% of a modified ethylene/α-olefin copolymer (a2) which is modified by having grafted thereon an unsaturated dicarboxylic acid or its anhydride and has a density in the range from 0.900 to 0.940 g/cm$^3$ and
    1–25% of an ethylene/vinyl alcohol copolymer (b), based on the weight of the composition,
and having a melt flow rate (MFR) according to ASTM D 1238 (190° C., 2160 g load) in the range from 0.001 to 0.2 g/10 min., a density in the range from 0.940 to 0.970 g/cm$^3$ and an Izod impact strength (with notch), determined according to ASTM D 256 at minus 40° C., of at least 100 J/m.

6. The resin composition (c) based on polyethylene as claimed in claim 5, wherein the proportion of the graft-modifying component relative to the entire resin composition (c) is 100–1,500 ppm.

7. The resin composition based on polyethylene as claimed in claim 5, which is obtained by crushing a multi-layered article and/or is a regrind of scraps of a multilayered article.

8. The resin composition based on polyethylene as claimed in claim 5, wherein the amount of unsaturated dicarboxylic acid or its anhydride grafted on the copolymer (a2) is in the range from 0.05 to 5% by weight.

* * * * *